United States Patent
Ha et al.

(10) Patent No.: US 12,112,582 B2
(45) Date of Patent: Oct. 8, 2024

(54) METHOD AND APPARATUS FOR VEHICLE DATA COLLECTION

(71) Applicants: Hyundai Motor Company, Seoul (KR); Kia Motors Corporation, Seoul (KR)

(72) Inventors: Jae Jun Ha, Hwaseong-si (KR); Young Jun Moon, Sejong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 471 days.

(21) Appl. No.: 16/787,961

(22) Filed: Feb. 11, 2020

(65) Prior Publication Data

US 2020/0265655 A1 Aug. 20, 2020

(30) Foreign Application Priority Data

Feb. 15, 2019 (KR) .................. 10-2019-0018133

(51) Int. Cl.
| | |
|---|---|
| G07C 5/00 | (2006.01) |
| G06F 8/65 | (2018.01) |
| G06Q 10/20 | (2023.01) |
| G06Q 20/00 | (2012.01) |
| G06Q 30/0601 | (2023.01) |

(Continued)

(52) U.S. Cl.
CPC .............. *G07C 5/008* (2013.01); *G06Q 10/20* (2013.01); *G06Q 20/00* (2013.01); *G06Q 30/0611* (2013.01); *G06Q 30/0645* (2013.01); *G06Q 40/08* (2013.01); *G06Q 50/10* (2013.01); *G06Q 50/14* (2013.01); *G06Q 50/40* (2024.01); *G07C 5/085* (2013.01); *H04W 4/40* (2018.02); *H04W 4/44* (2018.02); *G06F 8/65* (2013.01)

(58) Field of Classification Search
CPC .......... G07C 5/008; G07C 5/085; G07C 1/10; G06Q 10/20; G06Q 20/00; G06Q 30/0611; G06Q 30/0645; G06Q 40/08; G06Q 50/10; G06Q 50/14; G06Q 50/30; G06Q 30/04; H04W 4/40; H04W 4/44; G06F 8/65; H04L 67/12; B60R 16/023; G08G 1/01
See application file for complete search history.

(56) References Cited

U.S. PATENT DOCUMENTS

2003/0229528 A1* 12/2003 Nitao ..................... G06Q 10/10
709/224
2005/0288827 A1* 12/2005 Watkins ................ G01C 21/26
701/1

(Continued)

FOREIGN PATENT DOCUMENTS

| CN | 101340462 A | 1/2009 |
|---|---|---|
| CN | 104361651 A | 2/2015 |
| CN | 105141649 A | 12/2015 |

*Primary Examiner* — James J Lee
*Assistant Examiner* — Alexander George Matta
(74) *Attorney, Agent, or Firm* — Morgan, Lewis & Bockius LLP (57) ABSTRACT

A method of collecting vehicle data by a vehicle, may include acquiring the vehicle data of the vehicle; receiving information on whether consent to provision of information is provided for collection of the vehicle data; and transmitting a piece of the vehicle data in which the consent to provision of the information is given, to a vehicle data management server by use of a communication device of the vehicle.

12 Claims, 6 Drawing Sheets

(51) Int. Cl.
*G06Q 30/0645* (2023.01)
*G06Q 40/08* (2012.01)
*G06Q 50/10* (2012.01)
*G06Q 50/14* (2012.01)
*G06Q 50/40* (2024.01)
*G07C 5/08* (2006.01)
*H04W 4/40* (2018.01)
*H04W 4/44* (2018.01)

(56) References Cited

U.S. PATENT DOCUMENTS

| | | | | |
|---|---|---|---|---|
| 2007/0203756 | A1* | 8/2007 | Sears | G06Q 40/08 706/8 |
| 2009/0150023 | A1* | 6/2009 | Grau | G07C 5/008 455/466 |
| 2011/0196571 | A1* | 8/2011 | Foladare | G08G 1/207 701/31.4 |
| 2012/0130769 | A1* | 5/2012 | Maddulapalli | H04W 4/38 705/7.29 |
| 2014/0085110 | A1* | 3/2014 | Scofield | G07B 15/04 340/5.4 |
| 2018/0357438 | A1* | 12/2018 | Gayton | G06N 20/00 |
| 2019/0080113 | A1* | 3/2019 | Kim | G06F 21/6245 |
| 2020/0076895 | A1* | 3/2020 | Tsuyunashi | H04N 21/00 |
| 2020/0159251 | A1* | 5/2020 | Iwasaki | G08G 1/096805 |
| 2020/0219337 | A1* | 7/2020 | Kwak | G06F 21/6272 |

* cited by examiner

| Vehicle data | Detailed data | Whether information is provided |
|---|---|---|
| Vehicle driving record information | Visit area information | o |
| | Driving distance information | o |
| | Driving time information | o |
| | Driving pattern information | o |

| Vehicle data | Detailed data | Whether information is provided |
|---|---|---|
| Vehicle state information | Fuel-amount information | o |
| | Engine state information | o |
| | Vehicle software information | X |
| | Tire information | o |

FIG. 9

METHOD AND APPARATUS FOR VEHICLE DATA COLLECTION

CROSS REFERENCE TO RELATED APPLICATION

The present application claims priority to Korean Patent Application No. 10-2019-0018133, filed Feb. 15, 2019, the entire contents of which is incorporated herein for all purposes by this reference.

BACKGROUND OF THE INVENTION

Field of the Invention

The present invention relates to a method and an apparatus of collecting vehicle data through a vehicle data management system. Particularly, the present invention relates to a method and an apparatus of providing, by a vehicle, vehicle data to a vehicle data management server and receiving a service related to the vehicle data from a service server.

Description of Related Art

As technology has advanced, interest in utilization of vehicle data has increased. Technology for various methods for providing a personalized service to a driver is being developed. In terms of various service systems providing services to the driver, various types of vehicle data need to be collected to provide a personalized service to the driver.

However, a method of efficiently providing the vehicle data to a service system is not applied to the conventional vehicles, so that it is difficult for the service system to collect the vehicle data. Meanwhile, the conventional vehicle manufacturers could only collect the vehicle data only in a particular situation such as during vehicle maintenance, etc. However, there is no appropriate method of utilizing the collected vehicle data.

In this regard, a method may be provided in which a vehicle data management system efficiently collects the vehicle data and is linked to the service system to provide a personalized service to the driver. Hereinbelow, considering the above-described facts, a vehicle data system which may be used in managing the vehicle data will be described.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and an apparatus of collecting vehicle data by use of a vehicle data management system.

Various aspects of the present invention are directed to providing a method and an apparatus of collecting, by a vehicle data management server, vehicle data from a vehicle and providing the vehicle data to a service server by use of a vehicle data management system.

Various aspects of the present invention are directed to providing a method and an apparatus of providing, by a vehicle, vehicle data to a vehicle data management server and receiving a service related to the vehicle data from a service server by use of a vehicle data management system.

Various aspects of the present invention are directed to providing a method and an apparatus of controlling, by a vehicle data management server, a vehicle data management system and providing a personalized service to a driver.

According to an exemplary embodiment of the present invention, a method of providing vehicle data by a vehicle, the method includes, acquiring the vehicle data of the vehicle, receiving information on whether consent to provision of information is provided for collection of the vehicle data and transmitting a piece of the vehicle data in which the consent to provision of the information is given, to a vehicle data management server by use of a communication device of the vehicle.

The consent to provision of the information is determined according to a type of service that a driver of the vehicle requests.

The vehicle data includes at least one among collected-data list information, real-time traffic condition information, periodic road traffic condition information, event triggering road traffic condition information, service request information, vehicle state information, vehicle driving record information, vehicle sharing information, image information, in-vehicle temperature and environment information, vehicle impact information, driver information, and passenger information related to the vehicle.

The service that the driver of the vehicle requests includes at least one among an insurance service, a vehicle maintenance service, a location and communication service, a travel-agency-related service, a navigation device upgrade service, a driving path recommendation service, a software update service, a vehicle-tax-related service, a road state information service, and a vehicle rental service.

The vehicle has vehicle identification information set, the piece of the vehicle data in which the consent to provision of the information is provided is transmitted to the vehicle data management server, based on the vehicle identification information, and the vehicle data management server is configured to transmit, to a service server, information collected using the vehicle identification information related to each of the plurality of vehicles.

According to an exemplary embodiment of the present invention. A vehicle for providing vehicle data in a vehicle data management system, the vehicle includes a transceiver configured of transmitting and receiving a signal and a processor configured of controlling the transceiver, wherein the processor is configured to acquire the vehicle data of the vehicle, receive information on whether consent to provision of information is provided for collection of the vehicle data, and transmit a piece of the vehicle data in which the consent to provision of the information is given, to a vehicle data management server.

The consent to provision of the information is determined according to a type of service that a driver of the vehicle requests.

The vehicle data includes at least one among collected-data list information, real-time traffic condition information, periodic road traffic condition information, event triggering road traffic condition information, service request information, vehicle state information, vehicle driving record information, vehicle sharing information, image information, in-vehicle temperature and environment information, vehicle impact information, driver information, and passenger information related to the vehicle.

The service that the driver of the vehicle requests includes at least one among an insurance service, a vehicle maintenance service, a location and communication service, a travel-agency-related service, a navigation device upgrade service, a driving path recommendation service, a software update service, a vehicle-tax-related service, a road state information service, and a vehicle rental service.

The vehicle has vehicle identification information set, the piece of the vehicle data in which the consent to provision of the information is provided is transmitted to the vehicle data management server, based on the vehicle identification information, and the vehicle data management server is configured to transmit, to a service server, information collected using the vehicle identification information related to each of the plurality of vehicles.

According to an exemplary embodiment of the present invention, a method of collecting vehicle data from a vehicle by a vehicle data management server, the method includes, receiving the vehicle data from the vehicle, determining, by use of the received vehicle data, whether a service that a driver of the vehicle requests is provided and transmitting a piece of the vehicle data to a service server when the service that the driver requests is provided, the piece being required for providing the service.

The vehicle data received from the vehicle includes a piece in which consent to provision of information is provided for collection of the vehicle data.

The consent to provision of the information is determined according to a type of service that the driver of the vehicle requests.

The method further includes, receiving, from the vehicle, information on whether consent to provision of information is provided for collection of the vehicle data.

The vehicle has vehicle identification information set, the vehicle data management server is configured to receive a piece of the vehicle data in which consent to provision of information is given, from each of the plurality of vehicles, based on the vehicle identification information related to the vehicle, and the vehicle data management server is configured to transmit, to the service server, information collected using the vehicle identification information related to each of the plurality of vehicles.

The method further includes transmitting, to the service server, a request for a charge for the piece of the vehicle data transmitted to the service server.

The vehicle data includes at least one among collected-data list information, real-time traffic condition information, periodic road traffic condition information, event triggering road traffic condition information, service request information, vehicle state information, vehicle driving record information, vehicle sharing information, image information, in-vehicle temperature and environment information, vehicle impact information, driver information, and passenger information related to the vehicle.

The service that the driver of the vehicle requests includes at least one among an insurance service, a vehicle maintenance service, a location and communication service, a travel-agency-related service, a navigation device upgrade service, a driving path recommendation service, a software update service, a vehicle-tax-related service, a road state information service, and a vehicle rental service.

According to an exemplary embodiment of the present invention, the vehicle data may be collected using the vehicle data management system.

According to an exemplary embodiment of the present invention, by use of the vehicle data management system, the data management server can collect vehicle data from a vehicle and can provide the vehicle data to the service server.

According to an exemplary embodiment of the present invention, by use of the vehicle data management system, the vehicle can provide the vehicle data to the data management server and can receive the service related to the vehicle data from the service server.

According to an exemplary embodiment of the present invention, the data management server can control the vehicle data management system and can provide the personalized service to the driver.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings such that the present invention may be easily embodied by those skilled in the art to which the present invention belongs. However, the present invention may be embodied in various different forms and may not be limited to the exemplary embodiments set forth herein.

In describing the exemplary embodiments of the present invention, if it is decided that the detailed description of known function or configuration related to the present invention makes the subject matter of the present invention unclear, the detailed description is omitted. Also, portions that are not related to the description of the present invention are omitted in the drawings, and like reference numerals designate like parts.

In an exemplary embodiment of the present invention, when an element is "coupled to", "combined with", or "connected to" another element, it may be directly coupled to the other element or intervening elements may be present therebetween. Furthermore, when a component "includes" or "includes" an element, unless there is another opposite description thereto, the component does not exclude other elements but may further include the elements.

In an exemplary embodiment of the present invention, the terms "first", "second", etc. Are only used to distinguish one element from another element. Unless stated otherwise, the terms do not denote an order or importance. Thus, without departing from the scope of the present invention, a first element of an exemplary embodiment could be termed a second element of another exemplary embodiment of the present invention. Similarly, a second element of an exemplary embodiment could also be termed a first element of another exemplary embodiment of the present invention.

In an exemplary embodiment of the present invention, constituent elements that are distinguished from each other to clearly describe each feature do not necessarily denote that the constituent elements are separated. That is, a plurality of constituent elements may be integrated into one hardware or software unit, or one constituent element may be distributed into a plurality of hardware or software units. Accordingly, even if not mentioned, the integrated or distributed embodiments are included in the scope of the present invention.

In an exemplary embodiment of the present invention, constituent elements described in various embodiments do not denote essential elements, and some of the elements may be optional. Accordingly, an exemplary embodiment that includes a subset of constituent elements described in another exemplary embodiment of the present invention is included in the scope of the present invention. Also, an exemplary embodiment that includes the constituent elements which are described in the various embodiments and additional other elements is also included in the scope of the present invention.

Advantages and features of the present invention, and methods to achieve them will be apparent from the following embodiments that will be described in detail with reference to the accompanying drawings. It may be understood that the present invention is not limited to the following embodiments and may be embodied in different ways, and that the exemplary embodiments are given to provide complete disclosure of the present invention and to provide a thorough understanding of the present invention to those skilled in the art.

Figure 1:
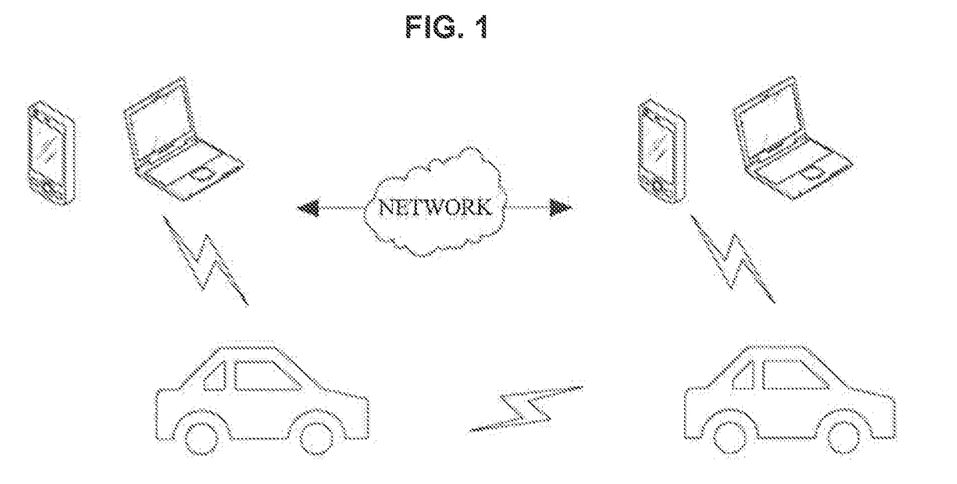
FIG. 1 is a diagram illustrating a method of performing, by a vehicle, communication with devices over a network.

FIG. 1 is a diagram illustrating a method of performing, by a vehicle, communication with another vehicle or a device over a network. Referring to FIG. 1, the vehicle may perform communication with another vehicle, a server, or a device. Herein, for example, the vehicle may perform communication with another vehicle, a server, or a device on the basis of cellular communication, WAVE communication, or other communication schemes. That is, the vehicle may be provided with a device configured for performing communication, and based on this, the vehicle may perform communication with another device.

Furthermore, for example, the communication device of the vehicle may separately include a module configured for performing communication only with a device positioned inside the vehicle for vehicle security, and a module configured for performing communication with an external device away from the vehicle. For example, inside the vehicle, communication, such as Wi-Fi communication, may be performed on the basis of security only for devices within a predetermined range inside the vehicle. For example, the vehicle and a personal possession device of the vehicle driver may include respective communication modules for performing only communication therebetween. That is, the vehicle and the personal device of the vehicle driver may use a communication network which is blocked from an external communication network. Furthermore, for example, the vehicle may include a communication module that performs communication with another vehicle, a server, or other devices.

Hereinafter, with reference to FIG. 2, FIG. 3, FIG. 4, FIG. 5, FIG. 6, and FIG. 7, operations of a vehicle, a vehicle data management server, and a service server which may be included in a vehicle data management system according to an exemplary embodiment of the present invention will be described.

Figure 2:
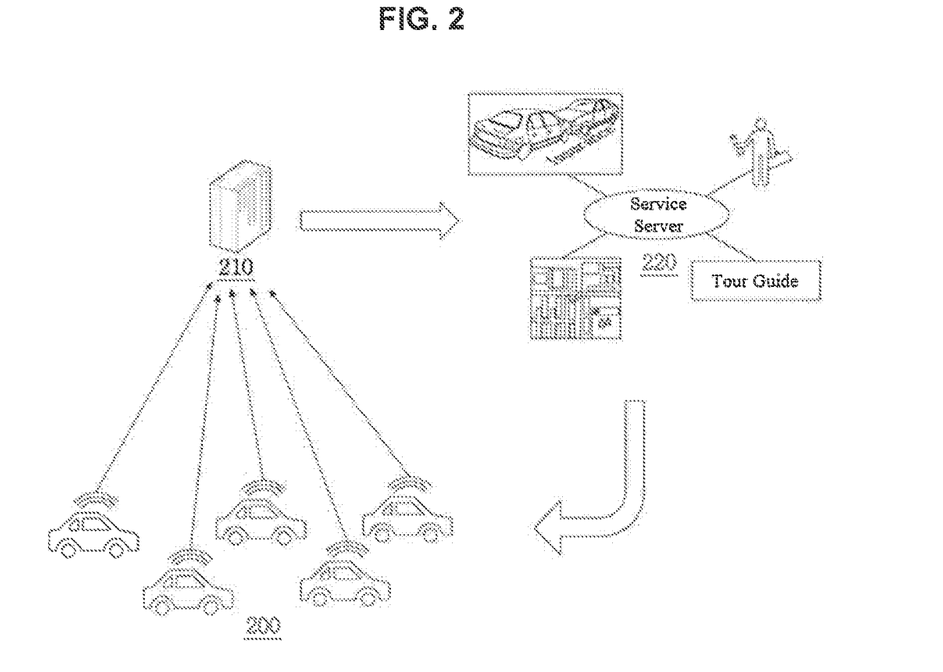
FIG. 2 is a diagram illustrating a vehicle data management system according to several embodiments of the present invention.

FIG. 2 is a diagram illustrating a vehicle data management system according to several embodiments of the present invention.

The vehicle data management system according to an exemplary embodiment of the present invention may refer to a system that efficiently collects vehicle data of a plurality of vehicles and provides a personalized service to a driver on the basis of the collected vehicle data.

The vehicle data management system according to several embodiments of the present invention may include a vehicle 200, a vehicle data management server 210, and a service server 220. Herein, there may be a plurality of vehicles 200. While traveling on the road, the vehicle 200 may exchange data with at least one among another vehicle 200, the vehicle data management server 210, and the service server 220, on the basis of the wireless communication scheme described above.

The vehicle 200 may provide the vehicle data to the vehicle data management server 210 on the basis of the communication scheme described above. For example, the vehicle data management server 210 may be a server operated by the manufacturer of the vehicle 200. However, the vehicle data management server 210 according to an exemplary embodiment of the present invention is not limited to the server operated by the manufacturer. The vehicle data management server 210 may collect vehicle data from vehicles of the manufacturer as well as vehicle data from vehicles of other manufacturers that allow provision of the vehicle data. Furthermore, the vehicle data management server 210 may be a server operated by a third-party company that wants to collect vehicle data, other than the manufacturer of the vehicle.

For example, collection of the vehicle data may be performed only with consent of the driver. The driver may consent to provision of information among various types of vehicle data selectively.

The vehicle data management server 210 may collect the vehicle data from the vehicle 200. For example, the vehicle data management server 210 may generate a database for the plurality of vehicles included in the system, on the basis of the collected vehicle data. For example, the vehicle data management server 210 may collect the vehicle data from the vehicle 200, on the basis of whether the driver consents to provision of information. That is, the vehicle data management server 210 may selectively collect the vehicle data depending on whether the driver consents to provision of information. Herein, the vehicle data management server 210 may generate the database on the basis of whether consent to provision of information according to the driver or the type of vehicle data of the vehicle is given.

The vehicle data management server 210 may provide the collected vehicle data to the service server 220. The service server 220 according to an exemplary embodiment of the present invention may be a server operated by a subject which is different from a subject operating the vehicle data management server. However, this is just one example, the vehicle data management server 210 and the service server 220 may be operated by the same subject.

The service server 220 may refer to a service provision application of a company configured for providing a personalized service to a driver. For example, the service server 220 may refer to a server for providing a service which is managed by a vehicle insurance company, a vehicle maintenance shop, a vehicle manufacturer, a vehicle parts manufacturer, a travel agency, a navigation device manufacturer, a transportation goods company, a mobile-service company, or a vehicle-related public institution. The companies listed above are examples, and the scope of the present invention is not limited to the types of listed companies. The service server 220 according to an exemplary embodiment of the present invention may refer to a server for providing a service which is operated by various types of companies configured for providing useful services to a driver by use of the vehicle data.

The service server 220 may provide a service required for the vehicle that provides the vehicle data, on the basis of the vehicle data received from the vehicle data management server 210. Herein, the service may be provided using a device embedded in the vehicle or by a device that the user separately owns. Herein, the device that the user separately owns may be a smartphone, a smart pad, a smart watch, a navigation device, a Hi-pass terminal, or the like. As an exemplary embodiment of the present invention, the device may refer to a device configured for performing other communications and exchanging signals, and it is not limited to the above-described embodiment. However, hereinafter, this is referred to as a device, for convenience of description.

As an exemplary embodiment of the present invention, the vehicle 200 may provide the vehicle data to the service server 220 on the basis of whether the driver makes a request for provision of a service. For example, when the driver makes the request for provision of a service, the vehicle 200 provides only the vehicle data corresponding to the requested service to the vehicle data management server 210. Conversely, when the driver makes the request for provision of a service, the vehicle data management server 210 collects only the vehicle data corresponding to the requested service.

The service server 220 may receive information on whether the driver makes the request for provision of a service, through the vehicle data management server 210. Alternatively, the service server 220 may receive information on whether consent to provision of a service is given, directly from the vehicle 200 or the driver.

Figure 3:
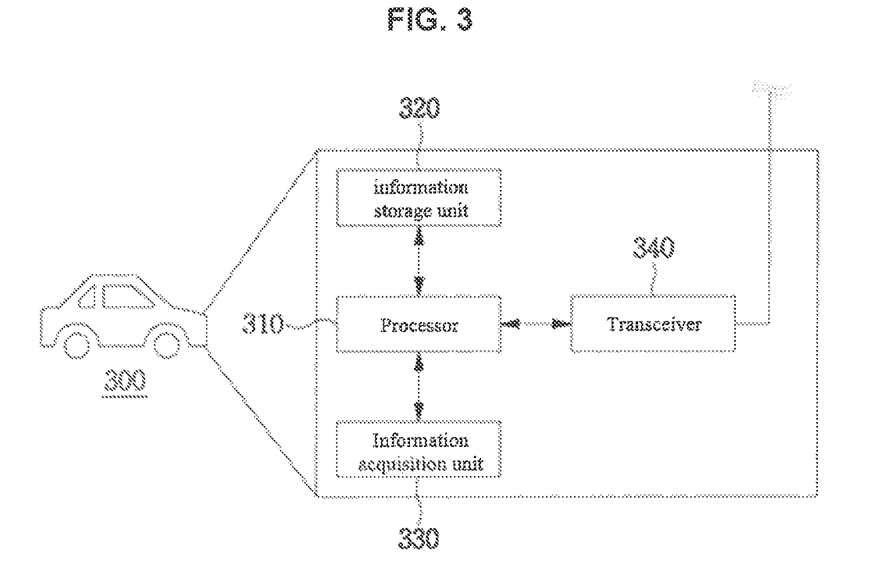
FIG. 3 is a diagram illustrating a vehicle which may be applied to a vehicle data management system.

FIG. 3 is a diagram illustrating a vehicle which may be applied to a vehicle data management system.

A vehicle 300 according to an exemplary embodiment of the present invention may include a processor 310, an information storage unit 320, an information acquisition unit 330, and a transceiver 340.

Herein, the processor 310 may be an entity for controlling transmission of the vehicle data described above. For example, the processor 310 may be a hardware configuration. As an exemplary embodiment of the present invention, the processor 310 may be a software configuration for performing an operation of controlling the transmission of the vehicle data, and it is not limited to the above-described embodiment.

Furthermore, for example, the information storage unit 320 may be an entity storing the vehicle data collected through the information acquisition unit 330.

Figure 4:
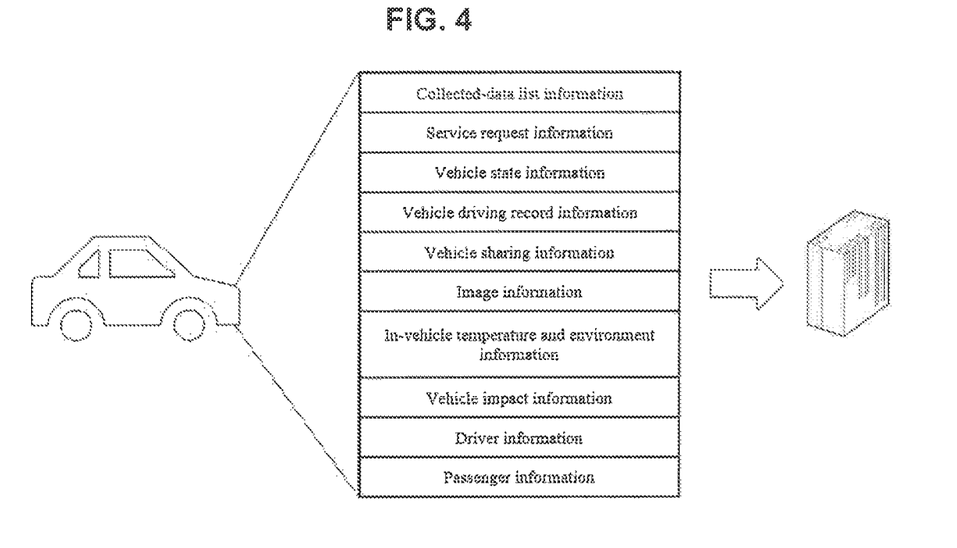
FIG. 4 is a diagram illustrating vehicle data provided to a vehicle data management server by a vehicle according to an exemplary embodiment of the present invention.

The information acquisition unit 330 may be an entity collecting the vehicle data. For example, the information acquisition unit may refer to an electronic control unit (ECU) of the vehicle which cooperates with on-board diagnostics (OBD). Furthermore, the information acquisition unit 330 may be an entity used to collect various types of vehicle data which will be defined below FIG. 4 is a diagram illustrating vehicle data provided to a vehicle data management server by a vehicle according to an exemplary embodiment of the present invention.

In an exemplary embodiment of the present invention, the vehicle data may include at least one among collected-data list information, real-time traffic condition information, periodic road traffic condition information, event triggering traffic condition information, service request information, vehicle state information, vehicle driving record information, vehicle sharing information, image information, in-vehicle temperature and environment information, vehicle impact information, driver information, and passenger information. The above-described vehicle data is an example, and various types of information related to the state or operation of the vehicle may be included in the vehicle data according to an exemplary embodiment of the present invention.

Herein, for example, the collected-data list information may be determined according to whether the driver consents to provision of the vehicle data or whether the driver makes the request for provision of a service. For example, when the driver consents to provision of an insurance service, the vehicle transmits vehicle data required for provision of the insurance service to the vehicle data management server.

The service request information may be information on a list of services that the driver requests. For example, the service request information may include information on whether a request for the following services is made: an insurance service, a vehicle maintenance service, location and communication services, a travel-agency-related service, a navigation device upgrade service, a path recommendation service, a software update service, a vehicle-tax-related service, a road state information service, a vehicle rental service, etc. The types of services listed above are examples, and the scope of the present invention is not limited to the types of listed services. In addition to the above examples, the services according to an exemplary embodiment of the present invention may include various services that the driver may receive.

Also, for example, the vehicle data may further include the real-time traffic condition information. For example, the vehicle may acquire the real-time traffic condition information on the basis of driving of the vehicle and may provide the same. Also, for example, the vehicle data may further include the periodic traffic condition information. Herein, the vehicle may be set to periodically collect information on traffic conditions, and the vehicle may include the information thereon in the vehicle data. Also, for example, the vehicle data may include the event triggering traffic condition information, That is, an event is triggered on the basis of an external command or a user's demand (or request), and on the basis of this, the vehicle may acquire the traffic condition information. Herein, the vehicle may include the traffic condition information based on the event triggering, in the vehicle data, and no limitation to the above-described embodiment is imposed.

Figure 5:
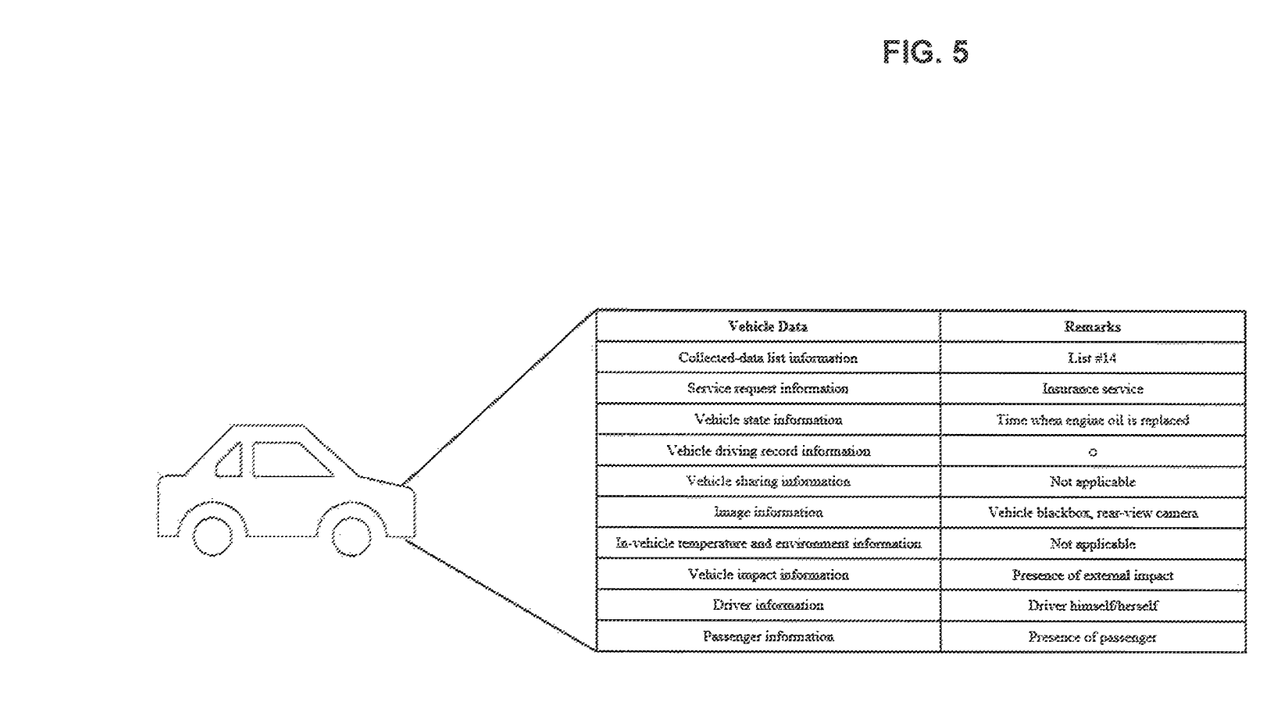
FIG. 5 is a diagram illustrating an example of vehicle data collected by a vehicle data management server according to an exemplary embodiment of the present invention.

FIG. 5 is a diagram illustrating an example of vehicle data collected by a vehicle data management server according to an exemplary embodiment of the present invention.

FIG. 5 shows an example of vehicle data that the vehicle data management server collects, in the case where the vehicle driver consents to collection of data for an insurance service and a vehicle maintenance service. As shown in FIG. 5, the vehicle data management server 210 may collect required vehicle data according to whether the user consents to provision of specified vehicle data. For example, a collected-data list may be defined in a form of an index.

For example, in FIG. 5, in the case where the service that the driver requests is an insurance service, the vehicle data management server may collect the following information which is vehicle data required for a service related to the insurance service: the vehicle state information, the vehicle driving record information, the image information, the vehicle impact information, the driver information, the passenger information, etc. Herein, the vehicle data management server may not collect the following information which is not required for the insurance service: the vehicle sharing information and the in-vehicle temperature and environment information.

Figure 6:
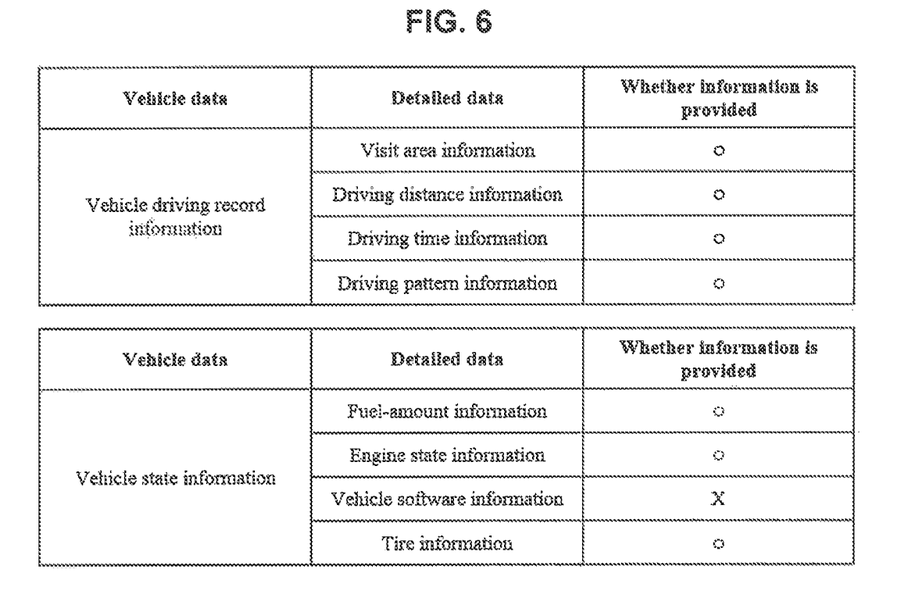
FIG. 6 is a diagram illustrating another example of vehicle data collected by a vehicle data management server according to an exemplary embodiment of the present invention.

FIG. 6 is a diagram illustrating another example of vehicle data collected by a vehicle data management server according to an exemplary embodiment of the present invention.

FIG. 6 shows detailed data of the collected vehicle data in the case where the service that the driver requests is the insurance service. The vehicle data management server may collect the vehicle data by identifying whether the driver consents to provision of the vehicle data or by identifying the requested service, for each piece of the detailed data of the vehicle data. For example, the detailed data of the vehicle driving record information may include visit area information, driving distance information, driving time information, driving pattern information, etc. As an exemplary embodiment of the present invention, the detailed data of the vehicle state information may include fuel-amount information, engine state information, and vehicle software information.

In the case where the service that the driver requests is the insurance service, the vehicle software information may not be required. Herein, the vehicle data management server may selectively collect the vehicle state information except the vehicle software information. On the other hand, all of the information which may be included in the detailed data of the vehicle driving record information may be vehicle data required for provision of the insurance service, in the instant case, the vehicle data management server may collect all the detailed data of the vehicle driving record information.

That is, the vehicle according to an exemplary embodiment of the present invention may selectively provide the vehicle data to the vehicle data management server according to whether the driver consents to provision of information or the type of requested service. Also, the vehicle data management server according to an exemplary embodiment of the present invention may selectively collect the vehicle data according to whether the driver consents to provision of information or the type of requested service.

Referring back to FIG. 3, the vehicle 300 may further include the transceiver 340. Herein, for example, the processor 310 of the vehicle 300 may perform communication with other devices through the transceiver 340, which is as described above. Herein, the devices may include at least one among another vehicle, the vehicle data management server 210, and the service server 220 as described above.

Although not shown in FIG. 3, the vehicle 300 may further include a display for displaying information related to a service provided from the service server 220. Furthermore, the display may display execution screen information related to an application program running at the vehicle 300, or user interface and graphic user interface (GUI) information according to the execution screen information.

The display may include at least one among a liquid crystal display (LCD), a thin-film-transistor liquid-crystal display (TFT LCD), an organic light-emitting diode (OLED) display, a flexible display, a 3D display, and an F ink display.

Also, the display may be implemented through a head unit of the vehicle, a head-up display, or the like. For example, a portion of the head unit of the vehicle may be provided as a display. For example, the head unit of the vehicle may directly have a display function. As an exemplary embodiment of the present invention, the display on the head unit of the vehicle may be implemented by the head unit of the vehicle and other devices (e.g., a projector, and a hologram), and no limitation to the above-described embodiment is imposed. As yet another example, an external display of an autonomous vehicle, an automated vehicle (semi-autonomous driving vehicle) or a vehicle may be used. That is, the display may be set as a device or a portion that the user can identify, and no limitation to the above-described embodiment is imposed.

Figure 7:
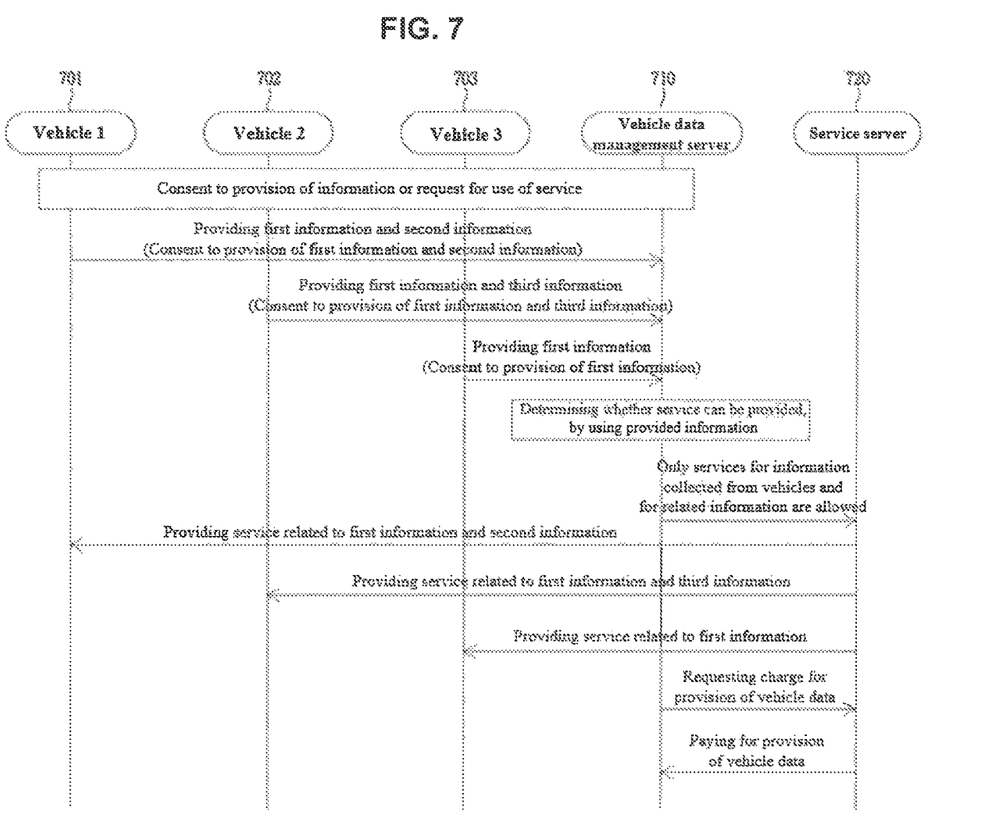
FIG. 7 is a diagram illustrating a method of managing vehicle data by a vehicle data management system.

FIG. 7 is a diagram illustrating a method of managing vehicle data by a vehicle data management system according to several embodiments of the present invention.

The vehicle data management system according to an exemplary embodiment of the present invention may include a plurality of vehicles 701, 702, and 703, a vehicle data management server 710, and a service server 720.

For example, the vehicle data management system may determine the type of vehicle data to be collected from each of the vehicles and the type of service to be provided, by use of information on whether the driver consents to provision of information related to the vehicle data or by use of a request for use of a service.

For example, the driver may determine consent to provision of information related to the vehicle data or the type of service desired to receive, through a communication device that each of the vehicles 701, 702, and 703 has. The vehicles 701, 702, and 703 may use the communication devices thereof to transmit information on whether the driver consents to provision of information related to the vehicle data or information on the type of service desired to receive to the vehicle data management server 710.

As an exemplary embodiment of the present invention, information on whether each vehicle driver consents to provision of information or information on the type of service desired to receive may be provided to the vehicle data management server 710 through a device that the driver owns.

As yet another example, information on whether each vehicle driver consents to provision of information related to the vehicle data or information on the type of service desired to receive may be directly input to the vehicle data management server 710. For example, when a driver purchases a vehicle, the driver provides relevant information to the vehicle manufacturer and the vehicle manufacturer directly inputs the information to the vehicle data management server 710.

The vehicles 701, 702, and 703 may transmit the required vehicle data to the vehicle data management server on the basis of information on whether consent to provision of information related to the vehicle data is provided or on the basis of the type of service desired to receive. Hereinafter, first information, second information, and third information may refer to vehicle data information having difference characteristics. Herein, the first information, the second information, and the third information are defined only to refer a plurality of pieces of information, and thus the number of the pieces of information present does not limit the scope of the present invention.

For example, first information, second information, and third information may be three pieces of information related to the above-described vehicle data, respectively. For example, the first information, the second information, and the third information may be the vehicle state information, the vehicle driving record information, and the image information, respectively.

Also, as an exemplary embodiment of the present invention, the first information, the second information, and the third information may refer to detailed data of the above-described vehicle data. For example, the first information, the second information, and the third information may refer to the visit area information, the driving distance information, and the fuel-amount information, respectively. Herein, the first information, the second information, and the third information are not limited to the detailed data belonging to one vehicle data category. Herein, the first information, the second information, and the third information may be information related to different detailed data belonging to different vehicle data.

For example, a first vehicle 701 may be a vehicle that consents to provision of the first and the second information. In the instant case, the first vehicle may transmit only the first information and the second information to the vehicle data management server 710 through the communication device of the first vehicle.

Herein, a second vehicle 702 may be a vehicle that consents to provision of the first and the third information. In the instant case, the second vehicle may transmit only the first information and the third information to the vehicle data management server 710 through the communication device of the second vehicle.

As an exemplary embodiment of the present invention, the first vehicle 701 may be a vehicle that requests provision of a first service which needs provision of the first information and the second information. In the instant case, the first vehicle 701 may transmit only the first information and the second information, which are necessary for the first service, to the vehicle data management server 710.

Herein, as an exemplary embodiment of the present invention, the second vehicle 702 may be a vehicle that requests a second service which needs provision of the first information and the third information. In the instant case, the second vehicle 702 may transmit only the first information and the third information, which are necessary for the second service, to the vehicle data management server 710.

The above description of the first vehicle 701 and the second vehicle 702 may be applied to a third vehicle 703 in the same manner.

That is, depending on whether the driver provides information, the vehicle may transmit only the vehicle data in which provision of the information is allowed, to the vehicle data management server 710, or may transmit only the vehicle data required for the service that the driver requests, to the vehicle data management server 710.

The vehicle data management server 710 collecting vehicle data from the plurality of vehicles 701, 702, and 703 may determine whether a service may be provided to each of the vehicles. The vehicle data management server 710 may determines that the vehicle data for the service requested by the vehicle is collected, on the basis of the type of service that a particular vehicle requests, and on the basis of the determination, may determine whether the service is provided.

For example, in the case where the service requested by the vehicle is a service that needs the first information and the second information, when the first information or the second information or both are missing in the vehicle data provided by the vehicle or when the vehicle provides only other information, the vehicle data management server 710 determines that it is impossible to provide the service to the vehicle. In the instant case, the vehicle data management server 710 may inform about the detail related to the demand for provision of the information, through the device of the vehicle or the vehicle driver's device. As an exemplary embodiment of the present invention, the vehicle data management server 710 may inform about a list of services that the driver can receive on the basis of the provided information, by use of the device of the vehicle or the vehicle driver's device.

The vehicle data management server 710 may transmit, on the basis of the determination of whether a service is possibly provided to each vehicle, the vehicle data collected from each vehicle to the service server 720. Herein, the vehicle data management server 710 may provide only the vehicle data required for the service requested by the driver, to the service server 720. Herein, the service server 720 may be a server managed by a company configured for providing the service requested by the driver.

The service server 720 may provide the service requested by the driver, on the basis of the vehicle data received from the vehicle data management server 710. The service server may provide the requested service through the device of the vehicle or the driver's device.

The vehicle data management server 710 may request a charge for the vehicle data provided to the service server 720. Herein, the charge for the vehicle data may be predetermined between subjects that manage the vehicle data management server 710 and the service server 720, respectively.

As an exemplary embodiment of the present invention, herein, the charge for the vehicle data may be determined using at least one among the number of vehicles that provide the vehicle data, the type of service provided, the type of vehicle data provided, the degree of driver satisfaction with the service, and the form of vehicle data provided. The above-described factors in determining the charge are just examples and thus do not limit the scope of the present invention.

In a response to the request for the charge from the vehicle data management server 710, the service server 720 may pay the vehicle data management server for provision of the vehicle data.

In an exemplary embodiment of the present invention, based on the above description, the vehicle data management server 710 and the service server 720 may perform data exchange therebetween, and on the basis of this, an operation may be performed. The vehicle data management server 710 may perform authentication with each of a plurality of service servers 720. That is, the vehicle data management server 710 may perform an authentication procedure with a service server 720. Herein, the vehicle data management server 710 may perform the authentication procedure with each of a plurality of particular service servers 720. Hereinafter, the description will be based on the vehicle data management server 710 and a particular service server 720, and may be applied to each service server 720 in the same manner.

For example, the vehicle data management server 710 may perform the authentication procedure with the particular service server 720 and may form a session therebetween. Herein, the session may refer to a state in which the vehicle data management server 710 and the particular service server 720 perform authentication with each other and thus can perform data exchange therebetween. For example, when the vehicle data management server 710 and the particular service server 720 form the session, the vehicle data management server 710 makes a session request to the particular service server 720 through a session request message. Herein, the session request message may include information provided to the particular service server 720 among pieces of information acquired from a plurality of vehicles by the vehicle data management server 710. Herein, the information contained in the session request message may vary according to service that the particular service server 720 provides. For example, in the case of the insurance service, the session request message may include at least one among the driving pattern information, average driving speed information, and the vehicle state information, and no limitation to the exemplary embodiment is imposed.

Also, for example, the session request message may include the above-described charge information. Herein, the charge information may vary according to the amount or priority of the information provided from the vehicle data management server 710. That is, when the amount of information is large, the charge information is at a high level. Furthermore, for example, when the priority of the information is high, the charge information is at a high level. Herein, when the information contained in the session request message is information corresponding to the service and the particular service server 720 consents to the charge information, the particular service server 720 transmits a session response message to the vehicle data management server 710. Afterward, the vehicle data management server 710 and the particular service server 720 may establish the session. Afterward, the vehicle data management server 710 may provide information acquired from the plurality of vehicles to the particular service server 720 in real time. Also, for example, the vehicle data management server 710 may provide information acquired from the plurality of vehicles to the particular service server 720 at predetermined intervals. Also, for example, the vehicle data management server 710 may provide information acquired from the plurality of vehicles on the basis of even triggering, and no limitation to the exemplary embodiment is imposed.

As an exemplary embodiment of the present invention, the vehicle data management server 710 may provide the particular service server 720 with only information on the vehicle that consents to provision of the vehicle information among the plurality of vehicles. Herein, each of the plurality of vehicles may determine whether to consent to provision of information. The vehicle that consents to provision of information may provide the information to the vehicle data management server 710. Herein, the particular service server 720 may receive information on the plurality of vehicles while maintaining the session with the vehicle data management server 710. For example, the particular service server 720 may provide a particular service to each vehicle on the basis of the received information on the plurality of vehicles. For example, the particular service server 720 may provide the service to each vehicle itself or a smart device corresponding to the vehicle. That is, the particular service server 720 may provide a particular service to the vehicle on the basis of the collected information. As an exemplary embodiment of the present invention, the charge information may be set on the basis of a time period in which the vehicle data management server 710 and the particular service server 720 maintain the session, and a subject operating the vehicle data management server 710 may make a charge to a subject operating the particular service server 720.

Figure 8A:
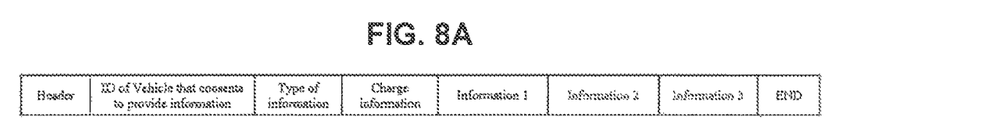
FIG. 8A and FIG. 8B are diagrams illustrating formats of messages exchanged to manage vehicle data in a vehicle data management system.
Figure 8B:
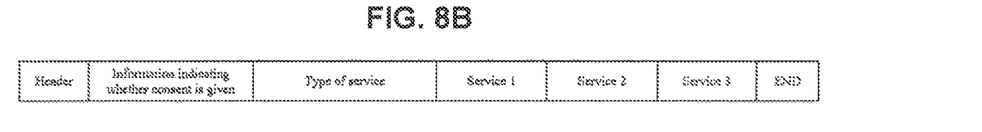

In the meantime, for example, referring to FIGS. 8A and 8B, FIG. 8A shows frame information on the session request message that the vehicle data management server 710 transmits to the particular service server 720. For example, the vehicle data management server 710 may include, in the frame, ID information related to the vehicle that consents to provision of information among the plurality of vehicles. Also, as an information type, information on a type related to a particular service or information may be included. Also, for example, the frame may include the charge information. Herein, the charge information may vary according to the amount of the above-described information or priority of the information. Also, fields indicating respective pieces of detailed information may be included. In the meantime, for example, each of the pieces of information may be indicated for each of a plurality of vehicle IDs, and the consent may vary from information to information.

Furthermore, FIG. 8B shows a frame format of the session response message that the particular service server 720 transmits to the vehicle data management server 710. For example, the frame may include information indicating whether the consent is given. Herein, for example, in the case where the consent is not given, information in the back portion of the frame may be reserved bits and may not include information. Conversely, for example, in the case where the particular service server 720 consents, information on the type of service and information on services may be included. For example, in the case where the type of service is tour guiding, the information on services may be restaurant information, hotel information, attraction information, etc., and no limitation to the exemplary embodiment is imposed. In the meantime, for example, each service may also be provided on the basis of the vehicle ID. Herein, a vehicle that consents to provision of information provides particular information may receive the corresponding service. For example, a particular vehicle may consent to provision of the driving record information and Global Positioning System (GPS) information. Herein, the particular vehicle may receive GPS, driving-based nearby area, restaurant, hotel, and attraction information, etc. As a tour guiding service. In the meantime, for example, the particular vehicle may consent to provision of the Global Positioning System (GPS) information and may not consent to provision of the driving record information. Herein, the particular vehicle may receive only the nearby area information as relevant service information, on the basis of only the GPS information. That is, different services may be provided depending on the service that the vehicle provides. Also, for example, the service server 720 may receive information directly from the vehicle that consents to provision of information among the plurality of vehicles. The service server 720 may identify only authority for collection of information from the vehicle data management server 710. That is, the vehicle data management server 710 may inform the service server 720 of only information on the vehicle that consents to provision of particular information for the service server 720. That is, the service server 720 may identify vehicle list information. For example, unlike the above description, the service server 720 may receive information directly from the plurality of vehicles. That is, the service server 720 may receive information directly from the vehicle that consents to provision of the information, and may provide, on the basis of the information, a service to the vehicle. Herein, for example, the vehicle data management server 710 may provide information on the service server 720 to the vehicle that consents to provision of information. That is, each vehicle may receive information on the service server 720 from the vehicle data management server 710, and on the basis of this, may provide required information to the service server 720.

As an exemplary embodiment of the present invention, the vehicle data management server 710 may control the type of communication that each vehicle and the service server 720 perform. For example, on the basis of a communication network or resources indicated by the vehicle data management server 710, each vehicle and the service server 720 may perform direction communication. For example, the vehicle data management server 710 controls the communication network or the resources used for direction communication considering the environment in which the plurality of vehicles are present so that the plurality of vehicles can smoothly communicate with the service server 720. No limitation to the exemplary embodiment is imposed.

Figure 9:
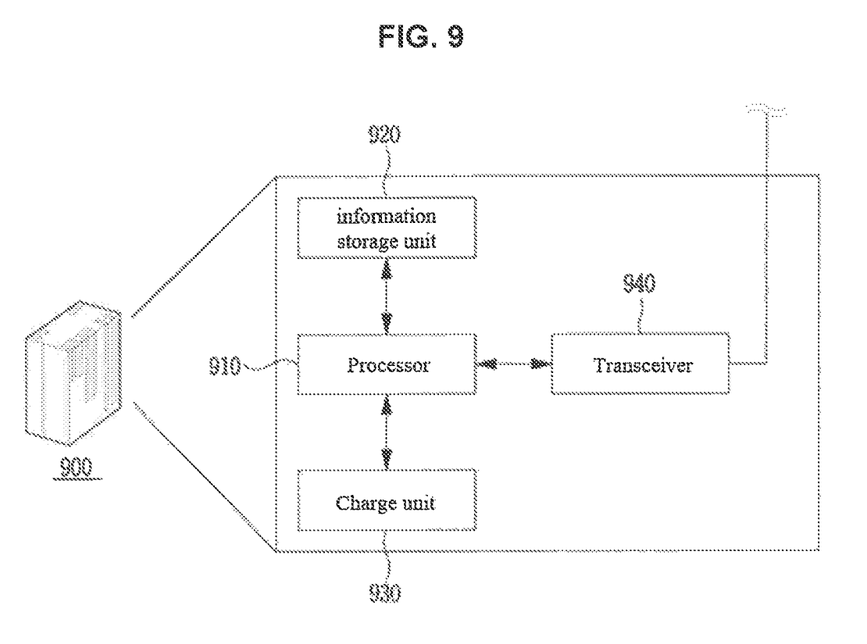
FIG. 9 is a diagram illustrating a vehicle data management server which may be applied to a vehicle data management system.

FIG. 9 is a diagram illustrating a vehicle data management server which may be applied to a vehicle data management system.

Referring to FIG. 9, a vehicle data management server 900 according to an exemplary embodiment of the present invention may include a processor 910, an information storage unit 920, a charge unit 930, and a transceiver 940. Detailed operations of the respective elements are the same as the description with reference to FIG. 1, FIG. 2, FIG. 3, FIG. 4, FIG. 5, FIG. 6, FIG. 7, and FIG. 8B, and thus will be roughly described.

Herein, the processor 910 may be an entity for controlling transmission and reception of the above-described vehicle data. For example, the processor 910 may be a hardware configuration. As an exemplary embodiment of the present invention, the processor 910 may be a software configuration for performing an operation of controlling the transmission and reception of the vehicle data, and it is not limited to the above-described embodiment.

The information storage unit 920 may be an entity storing the vehicle data provided from the vehicle. The information storage unit 920 may generate a database using the vehicle data provided from the vehicle for storage. Furthermore, the charge unit 930 may be an entity controlling the charge for provision of the vehicle data to the service server.

The vehicle data management server 900 may further include the transceiver 940. Herein, for example, the processor 910 of the vehicle data server 900 may perform communication with other devices through the transceiver 940, which is as described above. Herein, the devices may include at least one among the vehicle 200 and the service server 220 as described above.

Although the exemplary methods in an exemplary embodiment of the present invention are expressed as a series of operations for clarity of description, the order of the steps is not limited thereto. When necessary, the steps may be performed simultaneously or in a different order. To realize the method according to an exemplary embodiment of the present invention, other steps may be added to the illustrative steps, some steps may be excluded from the illustrative steps, or some steps may be excluded while additional steps may be included.

The Various embodiments of the present invention are not intended to list all possible combinations, but to illustrate representative aspects of the present invention. The matters described in the various embodiments may be applied independently or in a combination of two or more.

Furthermore, the various embodiments of the present invention may be implemented by hardware, firmware, software, or combinations thereof. In the case of implementation by hardware, implementation is possible by one or more application specific integrated circuits (ASICs), digital signal processors (DSPs), digital signal processing devices (DSPDs), programmable logic devices (PLDs), field programmable gate arrays (FPGAs), general processors, controllers, micro controllers, micro processors, and the like.

The scope of the present invention includes software or machine-executable instructions (for example, an operating system, an application, firmware, a program, and the like) that cause operation according to the methods of the various embodiments to be performed on a device or a computer, and includes a non-transitory computer-readable medium storing such software or instructions to execute on a device or a computer.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents

What is claimed is:

1. A method of providing vehicle data by a vehicle including a processor, the method comprising:
    acquiring, by the processor, the vehicle data of the vehicle;
    receiving, by the processor, information on whether consent to provision of information is provided for collection of the vehicle data, wherein the consent to provision of information is determined based on a request service type predetermined by a driver of the vehicle among preset request service types; and
    transmitting, by the processor, a piece of the vehicle data in which the consent to provision of the information is given, to a vehicle data management server by use of a communication device of the vehicle, wherein the transmitting the piece of the vehicle data comprises transmitting vehicle data corresponding to the request service type predetermined by the driver among the vehicle data to the vehicle data management server,
    receiving, by the processor, a list of available services among the preset request service types from the vehicle data management server when service of the predetermined request service type is impossible to provide, wherein the vehicle data management server determines that provision of the service is impossible when information necessary to provide the service is missing in the piece of the vehicle data, and wherein the vehicle data management server determines the list of the available services based on the piece of the vehicle data,
    providing information related to the list of available services provided from the vehicle data management server through a user interface to the driver to select a service among the list of available services, and
    providing from a service server the selected service.

2. The method of claim 1, wherein the vehicle data includes at least one among collected-data list information, real-time traffic condition information, periodic road traffic condition information, event triggering road traffic condition information, service request information, vehicle state information, vehicle driving record information, vehicle sharing information, image information, in-vehicle temperature and environment information, vehicle impact information, driver information, and passenger information related to the vehicle.

3. The method of claim 1, wherein the service that the driver of the vehicle requests includes at least one among an insurance service, a vehicle maintenance service, a location and communication service, a travel-agency-related service, a navigation device upgrade service, a driving path recommendation service, a software update service, a vehicle-tax-related service, a road state information service, and a vehicle rental service.

4. The method of claim 1,
    wherein the vehicle has vehicle identification information set,
    wherein the piece of the vehicle data in which the consent to provision of the information is provided is transmitted to the vehicle data management server, based on the vehicle identification information, and
    wherein the vehicle data management server is configured to transmit, to a service server, information collected using the vehicle identification information related to each of a plurality of vehicles.

5. A vehicle for providing vehicle data in a vehicle data management system, the vehicle comprising:
    a transceiver configured for transmitting and receiving a signal; and
    a processor configured for controlling the transceiver,
    wherein the processor is configured to:
        acquire the vehicle data of the vehicle,
        receive information on whether consent to provision of information is provided for collection of the vehicle data, wherein the consent to provision of information is determined based on a request service type predetermined by a driver of the vehicle among preset request service types,
        transmit a piece of the vehicle data in which the consent to provision of the information is given, to a vehicle data management server, wherein the processor is configured to transmit vehicle data corresponding to the request service type predetermined by the driver among the vehicle data to the vehicle data management server,
        receive a list of available services among the preset request service types from the vehicle data management server when service of the predetermined request service type is impossible to provide,
        wherein the vehicle data management server determines that provision of the service is impossible when information necessary to provide the service is missing in the vehicle data, and
        wherein the vehicle data management server determines the list of the available services based on the piece of the vehicle data,
        provide information related to the list of available services provided from the vehicle data management server through a user interface to the driver to select a service among the list of available services, and
        providing from a service server the selected service.

6. The vehicle of claim 5, wherein the vehicle data includes at least one among collected-data list information, real-time traffic condition information, periodic road traffic condition information, event triggering road traffic condition information, service request information, vehicle state information, vehicle driving record information, vehicle sharing information, image information, in-vehicle temperature and environment information, vehicle impact information, driver information, and passenger information related to the vehicle.

7. The vehicle of claim 5, wherein the service that the driver of the vehicle requests includes at least one among an insurance service, a vehicle maintenance service, a location and communication service, a travel-agency-related service, a navigation device upgrade service, a driving path recommendation service, a software update service, a vehicle-tax-related service, a road state information service, and a vehicle rental service.

8. The vehicle of claim 5,
    wherein the vehicle has vehicle identification information set,
    wherein the piece of the vehicle data in which the consent to provision of the information is provided is transmitted to the vehicle data management server, based on the vehicle identification information, and
    wherein the vehicle data management server is configured to transmit, to a service server, information collected using the vehicle identification information related to each of a plurality of vehicles.

9. A method of collecting vehicle data from a vehicle by a vehicle data management server including a processor, the method comprising:
- receiving, by the processor, the vehicle data from the vehicle, wherein the received vehicle data corresponds to a predetermined request service type;
- determining, by the processor, by use of the received vehicle data, whether a service that a driver of the vehicle requests is provided, wherein a provision of the service is determined as impossible when information necessary to provide the predetermined request service type is missing in the vehicle data;
- transmitting, by the processor, a piece of the vehicle data to a service server when the provision of the service is available, the piece being required for providing the service and transmitting, to the service servers;
- transmitting, by the processor, a list of available services among preset request service types to a device of the vehicle or the driver's device based on the vehicle data when the service of the predetermined request service type is impossible to provide;
- transmitting, by the processor, a request for a charge for the piece of the vehicle data to the service server; and
- receiving payment from the service server.

10. The method of claim 9,
wherein the vehicle has vehicle identification information set,
wherein the vehicle data management server is configured to receive a piece of the vehicle data in which consent to provision of information is given, from each of a plurality of vehicles, based on the vehicle identification information related to the vehicle, and
wherein the vehicle data management server is configured to transmit, to the service server, information collected using the vehicle identification information related to each of the plurality of vehicles.

11. The method of claim 9, wherein the vehicle data includes at least one among collected-data list information, real-time traffic condition information, periodic road traffic condition information, event triggering road traffic condition information, service request information, vehicle state information, vehicle driving record information, vehicle sharing information, image information, in-vehicle temperature and environment information, vehicle impact information, driver information, and passenger information related to the vehicle.

12. The method of claim 9, wherein the service that the driver of the vehicle requests includes at least one among an insurance service, a vehicle maintenance service, a location and communication service, a travel-agency-related service, a navigation device upgrade service, a driving path recommendation service, a software update service, a vehicle-tax-related service, a road state information service, and a vehicle rental service.

* * * * *